United States Patent
Adachi et al.

(10) Patent No.: US 12,508,531 B2
(45) Date of Patent: Dec. 30, 2025

(54) FILTER SHEET AND FILTER

(71) Applicant: TOYO ALUMINIUM EKCO PRODUCTS CO., LTD., Osaka (JP)

(72) Inventors: Masashi Adachi, Osaka (JP); Takuto Yamagishi, Osaka (JP); Mei Yamagishi, Osaka (JP)

(73) Assignee: TOYO ALUMINIUM EKCO PRODUCTS CO., LTD., Osaka (JP)

( * ) Notice: Subject to any disclaimer, the term of this patent is extended or adjusted under 35 U.S.C. 154(b) by 518 days.

(21) Appl. No.: 18/077,473

(22) Filed: Dec. 8, 2022

(65) Prior Publication Data

US 2023/0182057 A1  Jun. 15, 2023

(30) Foreign Application Priority Data

| Dec. 9, 2021 | (JP) | 2021-200106 |
| Oct. 27, 2022 | (JP) | 2022-172050 |

(51) Int. Cl.
*B01D 46/10* (2006.01)
*B01D 46/00* (2022.01)

(52) U.S. Cl.
CPC ......... *B01D 46/10* (2013.01); *B01D 46/0015* (2013.01); *B01D 46/0086* (2013.01); *B01D 2265/02* (2013.01); *B01D 2265/05* (2013.01); *B01D 2271/027* (2013.01); *B01D 2277/30* (2013.01); *B01D 2279/40* (2013.01); *B01D 2279/50* (2013.01)

(58) Field of Classification Search
CPC B01D 46/10; B01D 46/0015; B01D 46/0086; B01D 2265/02; B01D 2265/05; B01D 2271/027; B01D 2277/30; B01D 2279/40; B01D 2279/50; B01D 39/14; B01D 46/00; F04D 29/703
USPC .............................................. 55/511
See application file for complete search history.

(56) References Cited

U.S. PATENT DOCUMENTS

2013/0340400 A1* 12/2013 Minaeeghainipour ........................ B01D 46/10 55/511

FOREIGN PATENT DOCUMENTS

| JP | 6326513 | 5/2018 | |
| KR | 101791972 B1 * | 10/2017 | ........... F04D 29/703 |

* cited by examiner

*Primary Examiner* — Jennifer Dieterle
*Assistant Examiner* — Qianping He
(74) *Attorney, Agent, or Firm* — Wenderoth, Lind & Ponack, L.L.P.

(57) ABSTRACT

A filter bondable to a grille is provided. The filter is fixable alone to the grille so as not to separate therefrom without using another element such as a hook and loop fastener. The filter is constituted by a filter body and ears integrally connected to the outer edge of the filter body. The filter is bondable to the grille by bringing the filer body into abutment with the front surface of the grille, and bending the ears relative to the filter body until the ears abut against the side surface of the grille. By forming the ears at the filter, and bringing the ears into abutment with the side surface of the grille so as to be bonded thereto, it is possible to increase the attachment strength of the filter relative to the grille, compared to conventional filters each constituted by only a filter body.

19 Claims, 9 Drawing Sheets

FILTER SHEET AND FILTER

TECHNICAL FIELD

The present invention relates to a filter bondable to, e.g., an air vent, and a filter sheet from which the filter can be prepared (cut out).

BACKGROUND ART

Buildings are provided with air vents for ventilation. A cover or grille is attached to the portion of such an air vent on the outer side of a building so as to prevent, e.g., dust from entering the building through the air vent.

Such a grille generally has a louver shape or a mesh shape so as to least interfere with the passage of air through the air vent.

Also, since such a grille cannot catch minute dust or allergens such as pollen and dead ticks, attempts have been made to further increase catching performance by placing a filter made of nonwoven fabric onto the front surface of the grille.

As disclosed in the below-identified Patent Document 1, such a filter includes an adhesive layer on one surface thereof, and is generally fixed to the griller by bringing the adhesive layer into abutment with the front surface of the grille so as to be bonded thereto.

Such a filter is usually sold as a filter sheet including a to-be-cut-out portion defined by an easy break line such as a perforated line so as to be usable for air vents (grilles) different in size or shape. By cutting out the to-be-cut-out portion along the easy break line at home, the to-be-cut-out portion is used as a filter.

Also, such a filter generally has a circular shape, but there are not only round grilles but also grilles of the non-round hood type (boot type). If the shape of the filter does not coincide with the shape of a grille, the filter is appropriately cut and used.

PRIOR ART DOCUMENTS

Patent Documents

Patent document 1: Japanese Patent No. 6326513

SUMMARY OF THE INVENTION

Problems to be Solved by the Invention

If a filter is brough into abutment with, and bonded to, the front surface of a grille having, as described above, a louver shape or a mesh shape defining large gaps, the bonded area (contact area) of the filter relative to the grille is small, and thus the filter is likely to separate from the grille.

Therefore, a hook and loop fastener is often used together. For example, a hook and loop fastener is fixed beforehand to the front surface of the grille, e.g., with a double-sided adhesive tape.

In this case, by pushing a filter against the front surface of the grille, the filter is retained on the surface of the grille by not only the adhesiveness of the adhesive layer but also entangled fibers of the hook and loop fastener and the filter. Therefore, separation of the filter is prevented.

However, it is time-consuming to use a hook and loop fastener together with the filter, and fix the fastener to the grille beforehand. Therefore, it is required that a filter be easily fixable alone to a grille so as not to separate therefrom.

Such a problem occurs not only when bonding a filter to an air vent but also when bonding a filter to a different bonding object to be bonded to though which air can pass, e.g., a ventilation fan.

It is an object of the present invention to provide a filter attachable to a bonding object though which air can pass, e.g., an air vent, and a filter sheet for forming the filter, in which the filter can be fixed alone without using a separate member, such as a hook and loop fastener, to the bonding object so as not to be peeled off from the bonding object.

Means for Solving the Problems

In order to achieve the above object, the present invention provides a filter sheet comprising a to-be-cut-out portion which is defined by an easy break line, and which is usable as a filter by being cut out by breaking the easy break line, wherein the to-be-cut-out portion comprises: a filter body; an ear or ears integrally connected to an outer edge of the filter body, and wherein the filter, which is formed by cutting out the to-be-cut-out portion from the filter sheet, is attachable to a bonding object to be bonded to which has a front surface and a side surface, and through which air can pass, by bringing the filter body into abutment with the front surface of the bonding object, and bending the ear or the ears relative to the filter body until the ear or the ears abut against the side surface of the bonding object.

With this arrangement, since the filter is attached to a bonding object by bringing the filter body in abutment with the front surface of the bonding object, and further bending the ear(s) until the ear(s) abuts against the side surface of the bonding object, the attachment strength of the filter relative to the bonding object is high.

Therefore, it is possible to prevent separation of the filter from the bonding object by using the filter alone, without using another element such as a hook and loop fastener, i.e., without attaching such an element to the bonding object in advance.

In the filter sheet of the present invention, it is preferable that the filter body has a substantially circular shape, and the ears are disposed at equal intervals in a circumferential direction of the filter body.

With this shape/arrangement, since the shape of the filter body tends to coincide with the shape of a bonding object such as a general round grille, the filter is convenient in that it is possible to attach the filter to the bonding object without cutting the filter.

Also, since the plural ears are bent until the ears abut against the side surface of the bonding object, the attachment strength of the filter is high. Since the plural ears are disposed at equal intervals in the circumferential direction of the filter body, the attachment strength of the filter is substantially equal in the circumferential of the bonding object, and thus the attached state of the filter is stable.

In the filter sheet of the present invention, it is preferable that the filter body has a rectangular shape having long sides extending in a lateral direction, and the ears are disposed along the long sides of the filter body.

With this shape/arrangement, since the shape of the filter body tends to coincide with the shape of a bonding object such as a horizontally elongated rectangular-shaped air vent of a general central heating system, the filter is convenient in that it is possible to attach the filter to the bonding object without cutting the filter.

Also, since the plural ears are bent until the ears abut against the side surface of the bonding object, the attachment strength of the filter is high.

In the filter sheet of the present invention, the ear or each of the ears preferably includes, at a boundary between the filter body and the ear, a repulsion reducing portion for reducing elastic repulsion of the material of the filter when the ear is bent relative to the filter body.

With this arrangement, since the at least one repulsion reducing portion weakens the repulsive force of the filter formed of, e.g., a nonwoven fabric which is caused by its elasticity, it is possible to prevent the phenomenon in which the bent portions of the filter are gradually restored, and thus the ears are separated from the side surface of the bonding object.

While, as the repulsion reducing portion of the ear or each of the ears at the boundary between the filter body and the ear, various weakening lines such as a half-cut portion are considered, the repulsion reducing portion preferably comprises cuts or easy break portions which can become cuts by being broken when the filter is used, in that the formation is easy and a stable repulsion reducing effect is obtained.

It is preferable that the filter sheet of the present invention further comprises, inside the filter body, a second to-be-cut-out portion comprising: a small filter body defined by a second easy break line; and a small ear or small ears integrally connected to an outer edge of the small filter body, and the second to-be-cut-out portion is usable as a small filter by being cut out by breaking the second easy break line.

With this arrangement, the filter can be cut out and used with respect to a large bonding object, and the small filter can be cut out and used with respect to a small bonding object. In other words, it is possible to selectively use these filters according to the size of the bonding object. Therefore, the filter is convenient in that it is not necessary to adjust the size of the filter, e.g., by cutting the filter by hand at home.

In the filter sheet of the present invention, wherein a position of the small ear or each of the small ears where the small ear or each of the small ears is integrally connected to the small filter body is preferably displaced, in a circumferential direction of the filter sheet, from a position of the ear where the ear is integrally connected to the filter body, or from positions of the ears where the ears are integrally connected to the filter body.

If the position of the small ear or each of the small ears where it is integrally connected to the small filter body coincide, in the circumferential direction of the filter sheet, with the position of the ear where it is integrally connected to the filter body, or from the positions of the ears where they are integrally connected to the filter body, the small ear(s) will be adjacent to the ear(s). Therefore, when cutting out the ear(s), the cut portion of the ear(s) is likely to reach the small ear(s) beyond the easy break line, thus causing the filter to be torn off.

In the present invention, since the integrally connected position of the small ear or each of the small ears relative to the small filter body is displaced from the integrally connected position of the ear or a respective one of the ears relative to the filter body such that the small ear(s) is not aligned with the ear(s), it is possible to reduce tearing of the filter when cutting out the filter.

In the filter sheet of the present invention, one surface of at least the ear or each of the ears is preferably an adhesive layer that allows bonding of the filter to the side surface of the bonding object.

Various methods for attaching the filter to a bonding object are considered, but, if an adhesive layer is formed on the ear(s), it is possible to complete the attachment of the filter with ease, i.e., by simply bending the ear(s) relative to the filter body until the ear(s) is pushed against a bonding object, The filter sheet is attachable to various bonding objects through which air can pass, e.g., a ventilation fan, and is suitably usable as a filter for an air vent of a building.

In order to achieve the above object, the present invention also provides a filter comprising: a filter body; and an ear or ears integrally connected to an outer edge of the filter body; wherein the filter is attachable to a bonding object which has a front surface and a side surface, and through which air can pass, by bringing the filter body into abutment with the front surface of the bonding object, and bending the ear or the ears relative to the filter body until the ear or the ears abut against the side surface of the bonding object.

Effects of the Invention

Since each of the filter and the filter sheet of the present invention has the above structure, the filter is fixable alone to a bonding object so as not to separate therefrom, and the use of another element such as a hook and loop fastener is not required.

DETAILED DESCRIPTION OF THE INVENTION

Embodiments of the present invention are described below with reference to the drawings.

Figure 1A:
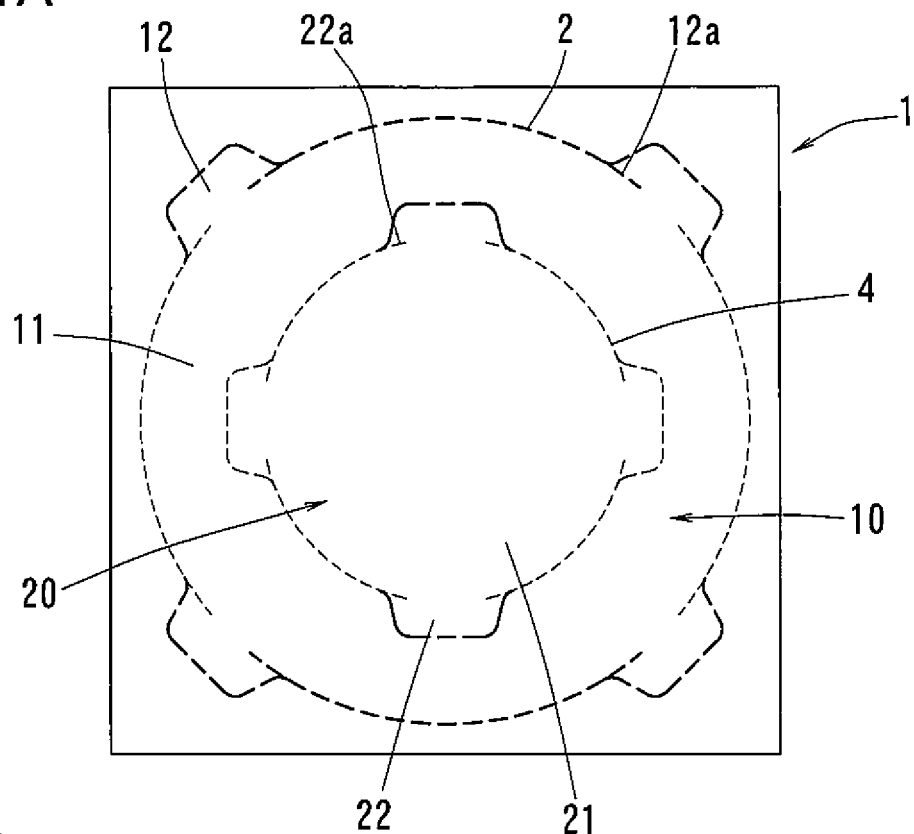
FIG. 1A is a front view of a filter sheet according to an embodiment of the present invention.
Figure 1B:
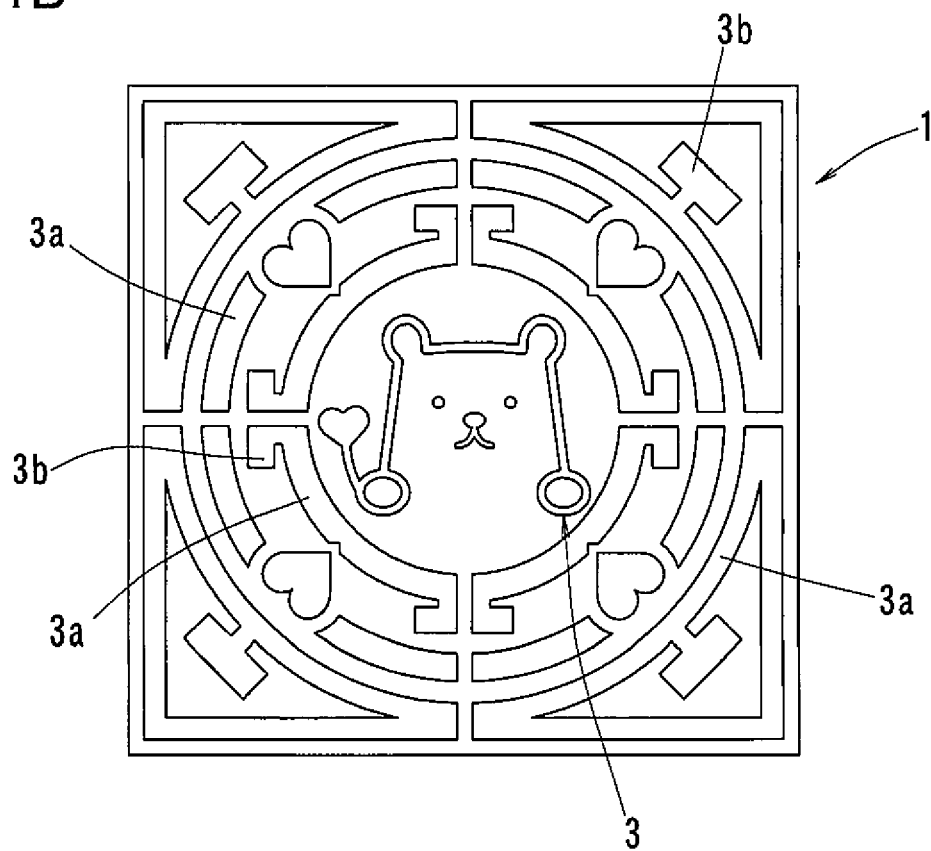
FIG. 1B is a back view thereof.
Figure 2:
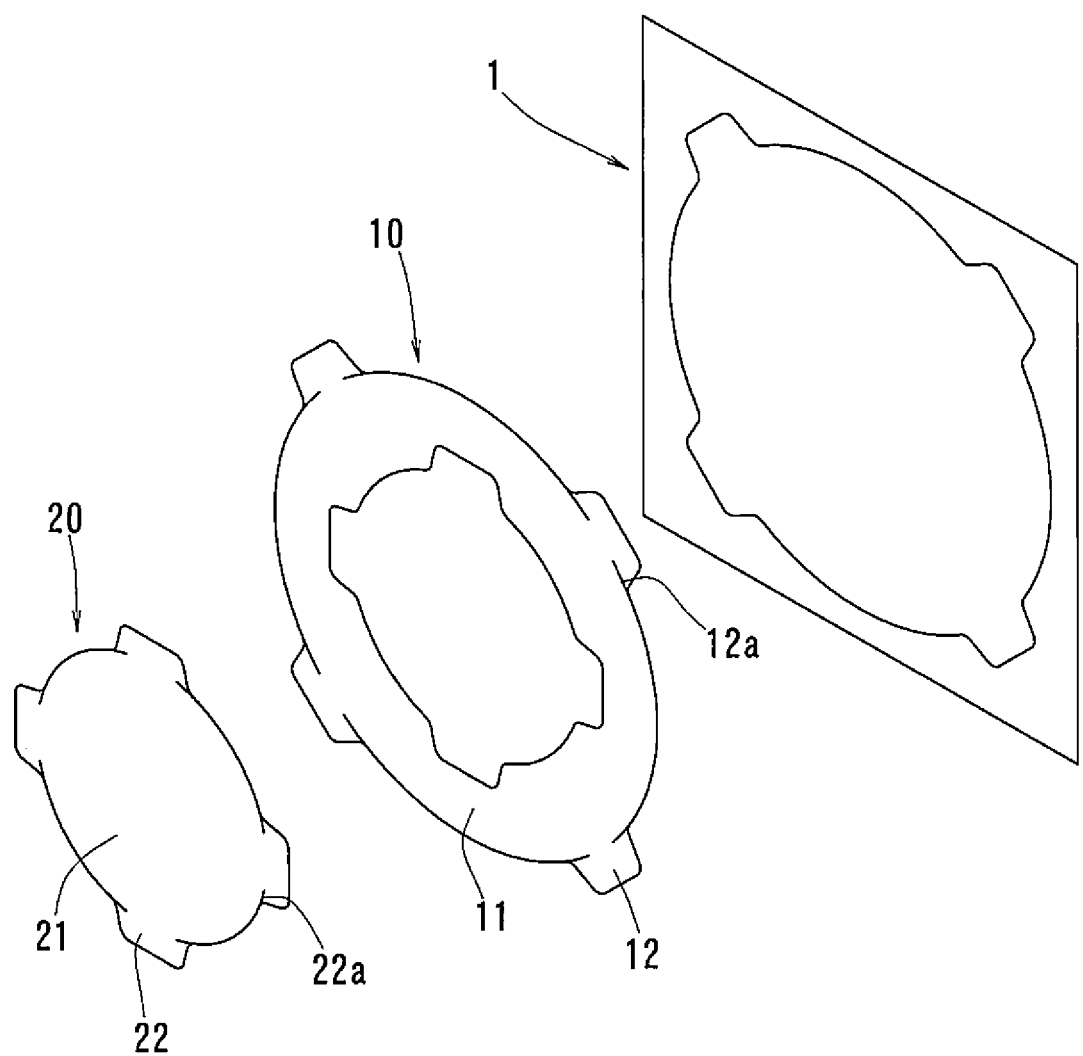
FIG. 2 is an exploded perspective view of the filter sheet of the embodiment.
Figure 3A:
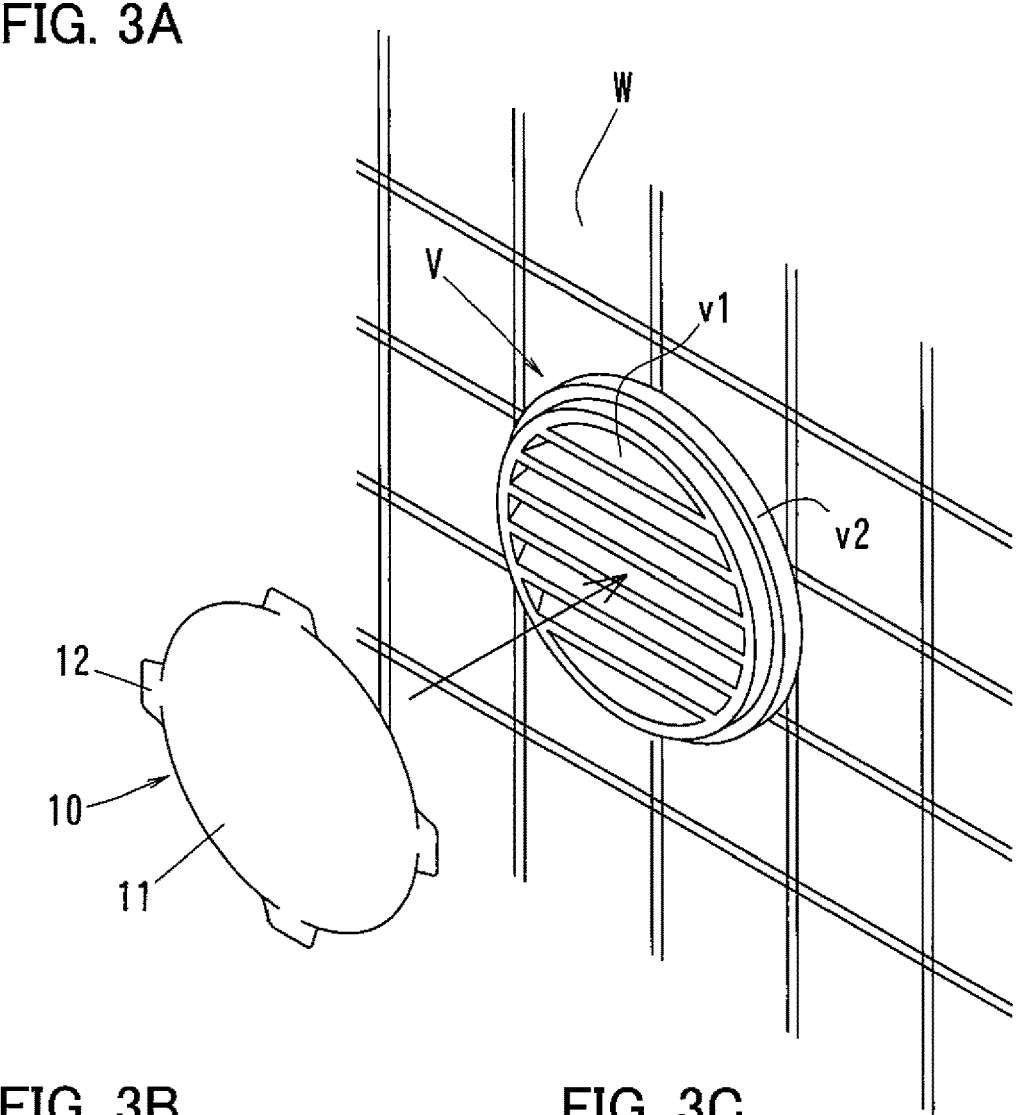
FIGS. 3A to 3C are perspective views illustrating how to attach a filter according to the embodiment.
Figure 3B:
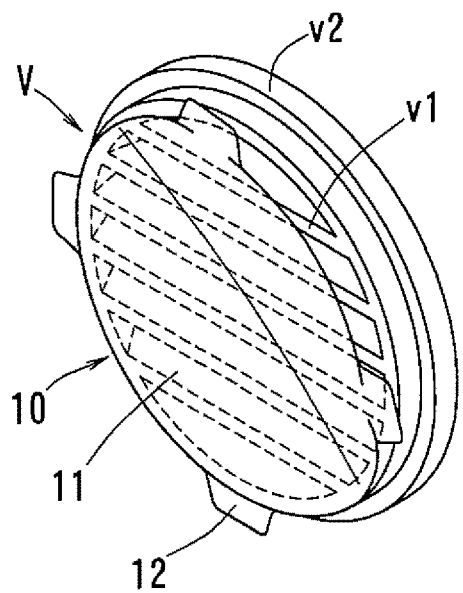

FIGS. 1A and 1B illustrate a filter sheet 1 (sheet for a filter) according to an embodiment of the present invention from which a filter 10 according to the embodiment can be cut out as illustrated in FIG. 2. As illustrated in FIGS. 3A and 3B, the filter 10 is placed on, and attached to, a grille V installed on a wall surface of a building on the outer side of an air vent. Since the attachment strength is improved as described later, separation of the filter 10 from the grille V is prevented.

As illustrated in FIG. 1A, the entire filter sheet 1 of the embodiment has a substantially square shape in plan view, and inside the square, a to-be-cut-out portion 10 (portion which is to be cut out) is defined by a perforated line 2 as an easy break line. By cutting out the to-be-cut-out portion 10 by breaking the perforated line 2, the to-be-cut-out portion 10 is used as the filter 10 of the embodiment.

As illustrated in FIG. 1A, the perforated line 2 comprises a fine perforated line portion extending in the vertical direction (in FIGS. 1A and 1B) of the filter sheet 1, and a coarse perforated line portion extending in the lateral direction (in FIGS. 1A and 1B) of the filter sheet 1.

If the filter is formed of a nonwoven fabric, because there is a difference in breakage strength of the filter between the vertical direction and the lateral direction, originating from the method of producing a nonwoven fabric, if a perforated line is used of which the vertical and lateral perforated line portions are the same in coarseness, a user may not be able to break the perforated line cleanly by hand. However, since the perforated line of the filter of the present invention comprises vertical and lateral line portions that are different in coarseness from each other as described above, when the user tries to break the perforated line 2 by applying a force in the vertical direction, the breakage strength is substantially the same in the vertical direction and the lateral direction. Therefore, it is possible to prevent e.g., unintended breakage due to, for example, the perforated line not being broken cleanly.

The back surface of the filter sheet 1 is subjected to an adhesive process to form an adhesive layer 3 of a specific pattern.

In FIG. 1B, as the pattern of the adhesive layer 3, a figure of a character is disposed at the center of the filter sheet 1; three ring-shaped FIG. 3a are concentrically disposed on the outer side thereof; and a square frame-shaped figure is further disposed on the outer side thereof. Of the three ring-shaped FIG. 3a, the outermost ring merges and is integrated with the square frame-shaped figure at the midpoints of the four sides of the square frame-shaped figure.

Also, chimney-shaped figures radially extend from, of the three ring-shaped FIG. 3a, each of the outermost ring and the innermost ring.

Further, heart-shaped figures are provided spaced apart from each other in, of the three ring-shaped figures, the center ring. Also, a cross-shaped adhesive layer-free portion extends from the center to partially cut out the ring-shaped FIG. 3a, the square frame-shaped figures and the chimney-shaped FIG. 3b of the adhesive layer 3.

With the filter 10 cut out from the filter sheet 1 and placed on the grille V, no air passes through the adhesive layer 3, which is formed by an adhesive process, and air passes through the other filter area, i.e., the area of the filter other than the adhesive layer 3. Therefore, the other filter area gradually darkens and discolors due to the adhesion of dust, whereas the adhesive layer 3 hardly discolors.

Therefore, the color contrast between the adhesive layer 3 and the other filter area appears over time, and the pattern of the adhesive layer 3 appears. The degree of the appearance of the pattern can be used as an indicator of the timing of replacement of the filter 10.

The adhesive constituting the adhesive layer 3 is not particularly limited in kind, and may be, e.g., a two-part polyurethane-based adhesive containing a main agent and a curing agent.

The rate of the area of the adhesive layer 3 relative to the area of the entire back surface of the filter is also not particularly limited, and may be, e.g., 10% to 60%. If this rate is less than 10%, it is difficult to bond the filter 10 to the grille V, whereas if more than 60%, the adhesive is excessive, thus increasing the cost.

The material of the filter sheet 1 is not particularly limited, and may be, e.g., a woven fabric, a nonwoven fabric or a porous sheet. Examples of the raw materials of woven and nonwoven fabrics include a natural fiber and a synthetic fiber such as polyester fiber, polyamide fiber or polyimide fiber. A nonwoven fabric made of polyester fiber is preferable in that it has excellent dust catching performance, and can be produced at a low cost. The method for producing a nonwoven fabric is also not particularly limited, and may be, e.g., thermal bonding or spun-bonding.

While the colors of the filter sheet 1 and the adhesive layer 3 are not particularly limited, it is preferable that the filter sheet 1 is white and the adhesive layer 3 is transparent to make the above-described pattern of the adhesive layer 3 stand out while the filter is in use.

The filter sheet 1 may be subjected to an anti-allergen treatment to improve its ability to catch allergens such as pollen and dead ticks.

The size of the filter sheet 1 is not particularly limited provided that the filter sheet 1 can completely cover the object to be bonded to (hereinafter referred to as the "bonding object"). If the filter sheet is attached to a grille on an air vent of a building on the outer side thereof, the size of the filter sheet 1 is preferably 150 mm by 150 mm to 310 mm by 310 mm. If less than 150 mm by 150 mm, the filter which is to be cut out therefrom will be too small to sufficiently cover a general grille, whereas if more than 310 mm by 310 mm, the filter sheet will be too large and a large space for displaying or storing the filter sheet will be required.

The thickness of the filter sheet 1 is also not particularly limited, but, if a nonwoven fabric is used, this thickness is preferably within the range of 0.5 to 5 mm, and more preferably within the range of 1 to 2 mm.

The weight of the filter sheet 1 per unit area is also not particularly limited, but if a nonwoven fabric is used, preferably within the range of 20 to 60 g/m$^2$, and more preferably within the range of 30 to 50 g/m$^2$. Within these ranges, the filter can effectively reduce the entry of dust, dirt, etc. from the outside of the building without significantly losing its air permeability.

As illustrated in FIGS. 1A and 1B, and FIG. 2, the filter 10 of the embodiment comprises a filter body 11, and four ears 12 integrally connected to the peripheral edge of the filter body 11.

The filter body 11 has a substantially circular shape in plan view. The position of the filter body 11 substantially coincides with the positions of the ring-shaped FIG. 3a of the adhesive layer 3. Therefore, the filter body 11 has adhesiveness on its back surface.

The four ears 12 have a substantially trapezoidal shape in plan view, and are disposed at equal intervals (about 90 degrees) in the circumferential direction of the filter body 11.

The ears 12 extend toward the four corners of the filter sheet 1, respectively. The positions of the ears 12 substantially coincide with the positions of the chimney-shaped FIG. 3b extending from, of the ring-shaped FIG. 3a of the adhesive layer 3, the outermost ring. Therefore, the ears 12 have adhesiveness on their back surfaces.

Since, as illustrated in FIGS. 1A and 1B, the adhesive layer 3 of the filter sheet 1 is present on the back surfaces of the filter body 11 and the ears 12, too, the filter 10 of the embodiment can be bonded to a grille V or the bonding object.

The size of the filter body 11 is also not particularly limited provided that the filter body 11 can completely cover the bonding object. If the filter body 11 is attached to a grille on an air vent of a building on the outer side thereof, the diameter of the filter body 11 can be set to, e.g., 100 mm to 310 mm.

If less than 100 mm by 100 mm, the filter body will not be able to sufficiently cover the front surface of a grille V having a general size, whereas if more than 310 mm by 310 mm, the filter body may partially protrude beyond the front surface of a grille V having a general size.

The size of each ear 12 is not particularly limited. For example, the dimension of the ear 12 in the circumferential direction of the filter body 11 can be set within the range of 20 mm to 40 mm, and the dimension of the ear 12 in the radial direction of the filter body 11 can be set within the range of 10 mm to 30 mm.

If these dimensions are below the above ranges, sufficiently large portions of the ears 12 may not be able to abut against the side surface of a grille having a general size, when bent. As a result, the retaining forces when the ears 12 are attached to the side surface may be insufficient, thus causing the filter to fall off. If these dimensions are above the above ranges, the ears 12 may partially protrude beyond the side surface of a grille having a general size, making it necessary to cut off the excess portions of the ears 12.

As illustrated in FIG. 1A, the perforated line 2, which defines the filter body 11, extends, on the boundary between the filter body 11 and each ear 12 of the filter 10, into the inner side of the ear 12.

As illustrated in FIG. 2, when cutting out the filter 10, by breaking the portions of the perforated line 2 extending into the inner side of each ear 12 (easy break portions), too, repulsion reducing portions 12a are formed at the ear 12.

When bending the ear 12 at the boundary between the filter body 11 and the ear 12, the repulsion reducing portions 12a prevent the return of the ear 12 to its unbent state due to the restoring elasticity of the material of the filter sheet 1.

The formation range of the repulsion reducing portions 12a (of each ear 12) is not particularly limited. For example, the formation range is preferably ⅕ to ⅘, and more preferably ⅖ to ⅗, of the dimension of the ear 12 in the circumferential direction of the filter body 11, though this depends on the thickness of the filter body 11.

If less than ⅕, the formation range is too small to sufficiently reduce the restoring elasticity of the material of the filter sheet 1, whereas if more than ⅘, the formation range is too large, thus causing the ear 12 to be easily torn off from the filter body 11.

As illustrated in FIG. 1A, the filter sheet 1 includes, inside the filter body 11, a second to-be-cut-out portion 20 defined by a second perforated line 4 as an easy break line.

As shown in FIG. 2, by cutting out the second to-be-cut-out portion 20 by breaking the second perforated line 4, the second to-be-cut-out portion 20 is used as a small filter 20 of the embodiment.

As illustrated in FIG. 1A, the second perforated line 4 comprises, as with the perforated line 2, a fine perforated line portion extending in the vertical direction (in FIGS. 1A and 1B) of the filter sheet 1, and a coarse perforated line portion extending in the lateral direction (in FIGS. 1A and 1B) of the filter sheet 1. Therefore, the second perforated line 4 can be uniformly broken.

As illustrated in FIG. 1A, 1B and FIG. 2, the small filter 20 of the embodiment comprises a small filter body 21, and four small ears 22 integrally connected to the peripheral edge of the small filter body 21.

The small filter body 21 has a substantially circular shape in plan view.

The position of the small filter body 21 substantially coincides with the position of, of the ring-shaped FIG. 3a of the adhesive layer 3, the innermost ring. Therefore, the small filter body 21 has adhesiveness on its back surface.

The four small ears 22 have a substantially trapezoidal shape in plan view, and are disposed at equal intervals (about 90 degrees) in the circumferential direction of the small filter body 21.

The small ears 22 extend toward the midpoints of the four sides of the filter sheet 1, respectively. Therefore, the positions of the small ears 22 where the small ears 22 are integrally connected to the small filter body 21 are displaced (by about 45 degrees) from the positions of the respective ears 12 where the ears 12 are integrally connected to the filter body 11, in the circumferential direction of the filter 10 and the small filter 20. The positions of the small ears 22 substantially coincide with the positions of the chimney-shaped FIG. 3b which extend from the innermost one of the ring-shaped FIG. 3a of the adhesive layer 3. Therefore, the small ears 22 have adhesiveness on their back surfaces.

If the grille to which the filter is to be attached has a small size, instead of the filter 10, the small filter 20 is used by cutting out the small filter 20 from the filter sheet 1.

The size of the small filter body 21 is not particularly limited provided that the small filter body 21 is smaller than the filter body 11.

The size of each small ear 22 is not particularly limited, but in order that the bonding performance of the small filter 20 relative to the grille V is not inferior to that of the filter 10, the sizes of the small ear 22 maybe, e.g., substantially equal to the sizes of the ears 12.

As illustrated in FIG. 1A, as with the filter 10, the second perforated line 4, which defines the small filter body 21, extends to the inner side of each small ear 22 on the boundary between the small filter body 21 and the small ear 22 of the small filter 20.

As illustrated in FIG. 2, when cutting out the small filter 20, by breaking the portions of the second perforated line 4 extending to the inner side of the small ear 22 (easy break portions); too, repulsion reducing portions 22a are formed at the small ear 22.

When bending the small ear 22 at the boundary between the small filter body 21 and the small ear 22, the repulsion reducing portions 22a prevents the return of the small ear 22 to its unbent state due to the restoring elasticity of the material of the filter sheet 1.

The formation range of the repulsion reducing portions 22a (of each small ear 22) is not particularly limited. For example, for the same reason as set forth regarding the repulsion reducing portions 12a, the formation range is preferably ⅕ to ⅘, and more preferably ⅖ to ⅗, of the dimension of the small ear 22 in the circumferential direction of the small filter body 21. If less than ⅕, the formation range is too small to sufficiently reduce the restoring elasticity of the material of the filter sheet 1, whereas if more than ⅘, the formation range is too large, thus causing the small ear 22 to be easily torn off from the small filter body 21.

Having described the structure of the filter sheet 1 of the embodiment, description is now made, with reference to FIGS. 3A to 3C and FIGS. 4A and 4B, of how to use the filter 10 and the small filter 20 of the embodiment that are cut out from this filter sheet 1.

While how to use the filter 10 is described in the shown example, the same is true for the small filter 20.

Figure 3C:
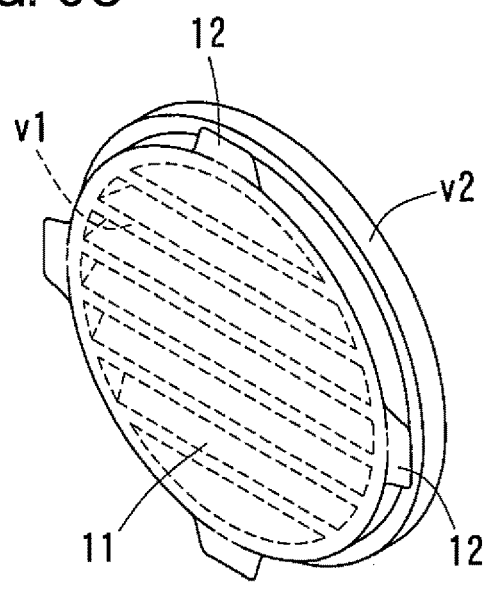

First, as illustrated in FIGS. 3A to 3C, the filter 10 is moved to a position where the adhesive layer 3 is opposed to the front surface v1 of a grille V on an outer wall surface W of a building; and the filter body 11 is bonded to the front surface v1 of the grille V by bringing the filter body 11 into abutment with the front surface v1 and pressing the filter body 11 against the front surface v1. The grille V has a flat cylindrical shape, and the shape of its front surface coincides with the shape of the filter body 11.

Figure 4A:
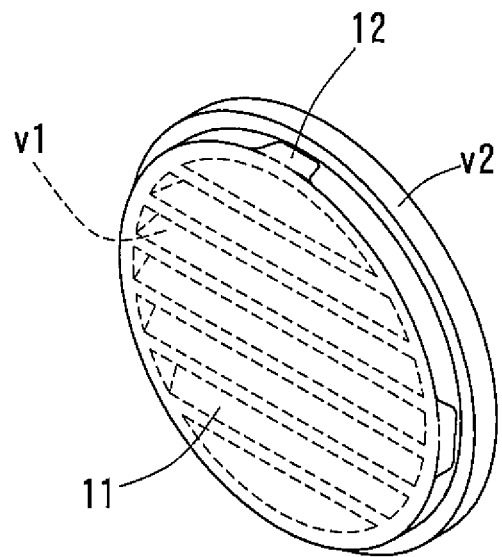
FIGS. 4A and 4B are perspective views illustrating how to attach the filter of the embodiment.
Figure 4B:
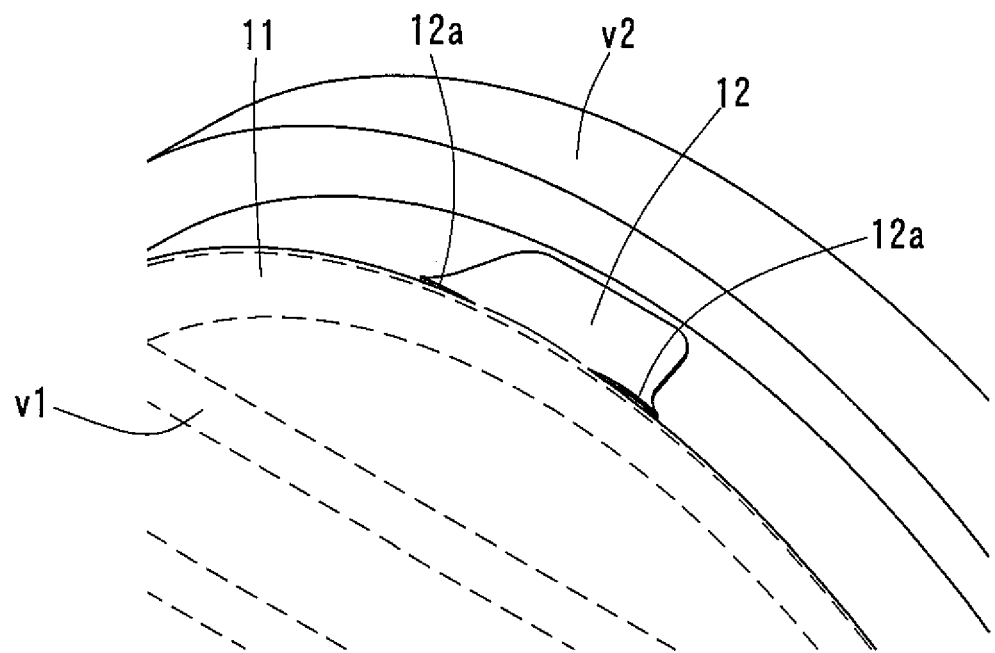

Next, as illustrated in FIGS. 4A and 4B, the ears 12 are bonded to the side surface v2 of the grille V by bending the ears 12 relative to the filter body 11 until the ears 12 abut against the side surface v2, and pressing the ears 12 against the side surface v2.

By bonding not only the filter body 11 but also the ears 12 to the grille V, it is possible to prevent separation of the filter 10 from the grille V.

Since the repulsion reducing portions 12a reduce the repulsive force of the filter material, separation of the ears 12 from the side surface of the grille V is prevented, and the ears 12 are kept bonded to the grille.

Figure 5:
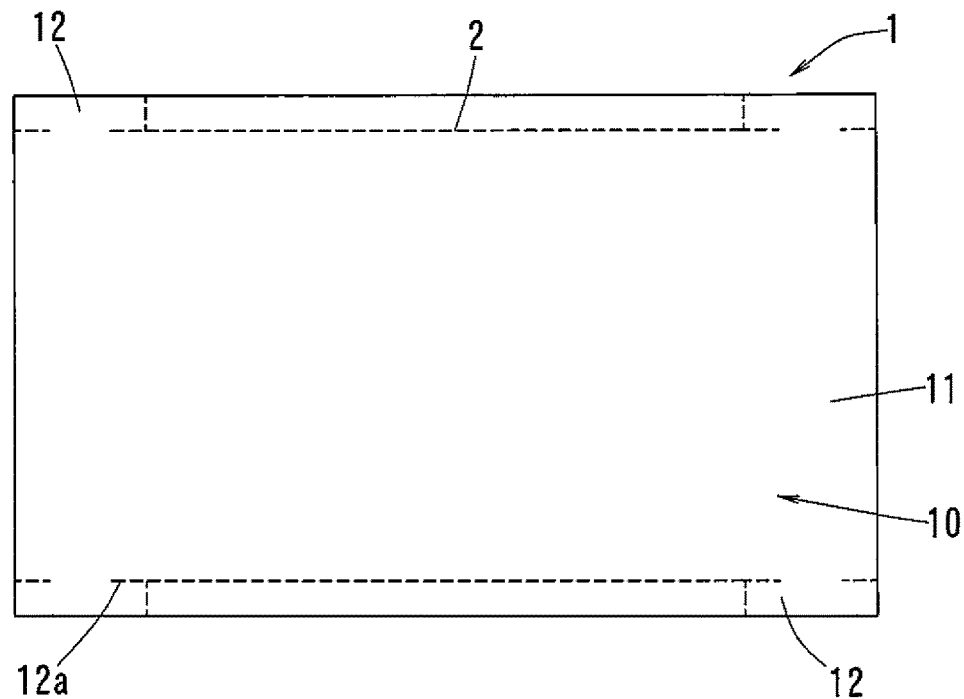
FIG. 5 is a front view of a filter sheet according to a different embodiment of the present invention
Figure 6:
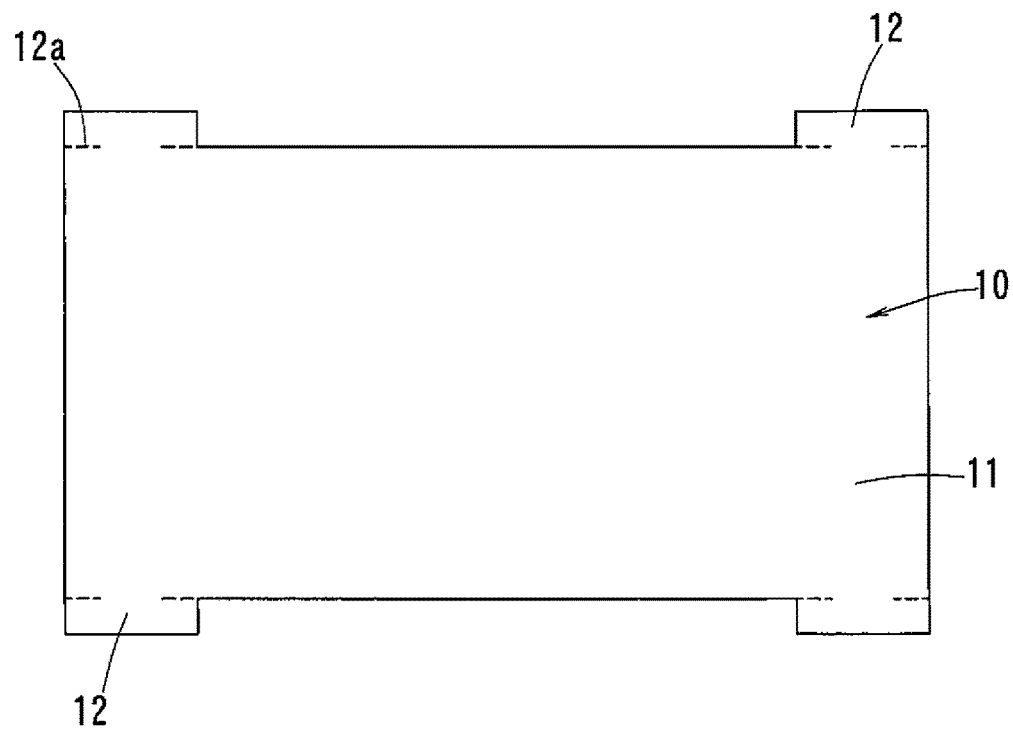
FIG. 6 is a front view of a filter according to the different embodiment.
Figure 7:
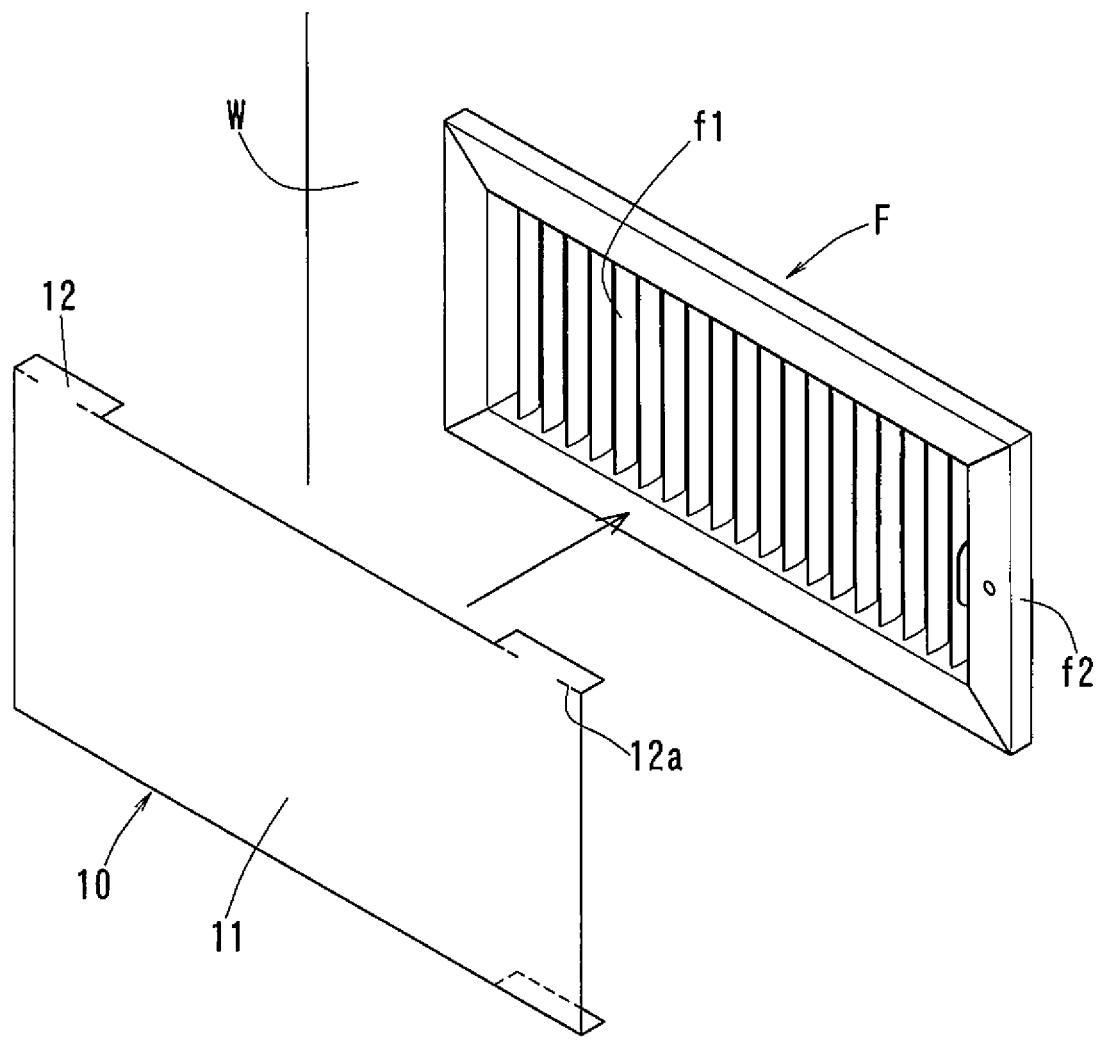
FIG. 7 is a perspective view illustrating how to attach the filter of the different embodiment.

FIG. 5 illustrates a filter sheet 1 (sheet for a filter) according to a different embodiment of the present invention from which a filter 10 according to the different embodiment can be cut out as illustrated in FIG. 6. As illustrated in FIG. 7, In a central heating system, i.e., a heating system in which a heat source device is installed at a predetermined place in a building, and heated air is fed to rooms of the building that need heating, from the heat source device through pipes under the floor or in the wall. the filter 10 is placed on, and attached to, a frame body F of an air vent of each of the rooms that need heating.

The features of the filter sheet and the filter of the different embodiment which are the same as those of the above-described embodiment are not described below.

As illustrated in FIG. 5, the entire filter sheet 1 of the different embodiment has a rectangular shape having long sides extending in the lateral direction in plan view, and includes, inside the rectangle, a to-be-cut-out portion 10 (portion which is to be cut out) defined mostly by perforated lines 2 as easy break lines which extend parallel to the long sides of the filter sheet 1, respectively.

By cutting out the to-be-cut-out portion 10 by breaking the perforated lines 2, the to-be-cut-out portion 10 is used as the filter 10 of the different embodiment.

The portions of the filter sheet 1 discarded after cutting out the filter 10 are limited to strip-shaped small pieces of the filter sheet 1 along its long sides. Therefore, it is possible to effectively use the material and reduce waste.

The back surface (not shown) of the filter sheet 1 is subjected to an adhesive process to form an adhesive layer of in an appropriate pattern such that the adhesive layer least interferes with the passage of air through the filter sheet.

As illustrated in FIG. 6, the filter 10 of the different embodiment comprises a filter body 11, and four ears 12 integrally connected to the edge of the filter body 11.

The filter body 11 has a rectangular shape having long sides extending in the lateral direction in plan view. The four ears 12 also have a rectangular shape having long sides extending in the lateral direction in plan view, and are on the long sides of the filter body 11 and disposed at the four corners of the filter body. Portions of the outer edge of the filter body 11 and portions of the outer edges of the ears 12 constitute portions of the outer edge of the filter sheet 1.

The filter body 11 and the ears 12 have adhesiveness on their back surfaces.

As illustrated in FIG. 5, the perforated lines 2, which define the filter body 11, extend to the inner sides of the ears 12 on the boundaries between the filter body 11 and the ears 12 of the filter 10.

As illustrated in FIG. 6, when cutting out the filter 10, by breaking the portions of the perforated lines 2 extending to the inner sides of the ears 12 (easy break portions), too, repulsion reducing portions 12a are formed at the ears 12.

When bending each ear 12 at the boundary between the filter body 11 and the ear 12, the repulsion reducing portions 12a prevent the return of the ear 12 to its unbent state due to the restoring elasticity of the material of the filter sheet 1.

As illustrated in FIG. 7, the filter 10 of the filter sheet 1 of the different embodiment, which has the above structure, is moved to a position where the adhesive layer is opposed to an air vent on an inner wall surface W of each room of a building which uses a central heating system; and the filter body 11 is bonded to the front surface v1 of a frame body F attached to the air vent by bringing the filter body 11 into abutment with the front surface v1 and pressing the filter body 11 against the front surface v1. The frame body F has an extremely flat rectangular parallelepiped shape, and the shape of its front surface f1 with a louver coincides with the shape of the filter body 11.

Next, as illustrated in FIG. 7, the ears 12 are bonded to the side surface f2 of the frame body F of the air vent by bending the ears 12 relative to the filter body 11 until the ears 12 abut against the side surface f2, and pressing the ears 12 against the side surface v2.

By bonding not only the filter body 11 but also the ears 12 to the frame body F of the air vent, it is possible to prevent separation of the filter 10 from the frame body F.

The repulsion reducing portions 12a prevent separation of the ears 12 from the side surface of the air vent, and the ears 12 are kept bonded to the frame body.

The ears 12 may be fixed in position by inserting the ears 12 into the gap between the inner wall surface and the frame body of the air vent so as to be sandwiched therebetween.

Also, the formation positions and the formation ranges of the ears 12 are not limited to the shown example. For example, the ears 12 may be formed along the entire long sides of the filter body 11, or formed on the short sides of the filter body 11.

Also, while, in this embodiment, the filter 10 is attached to an air vent of each room of a building which uses a central heating system, the filter 10 may be attached to an air inlet through which air is introduced from the outside of the building.

Figure 8:
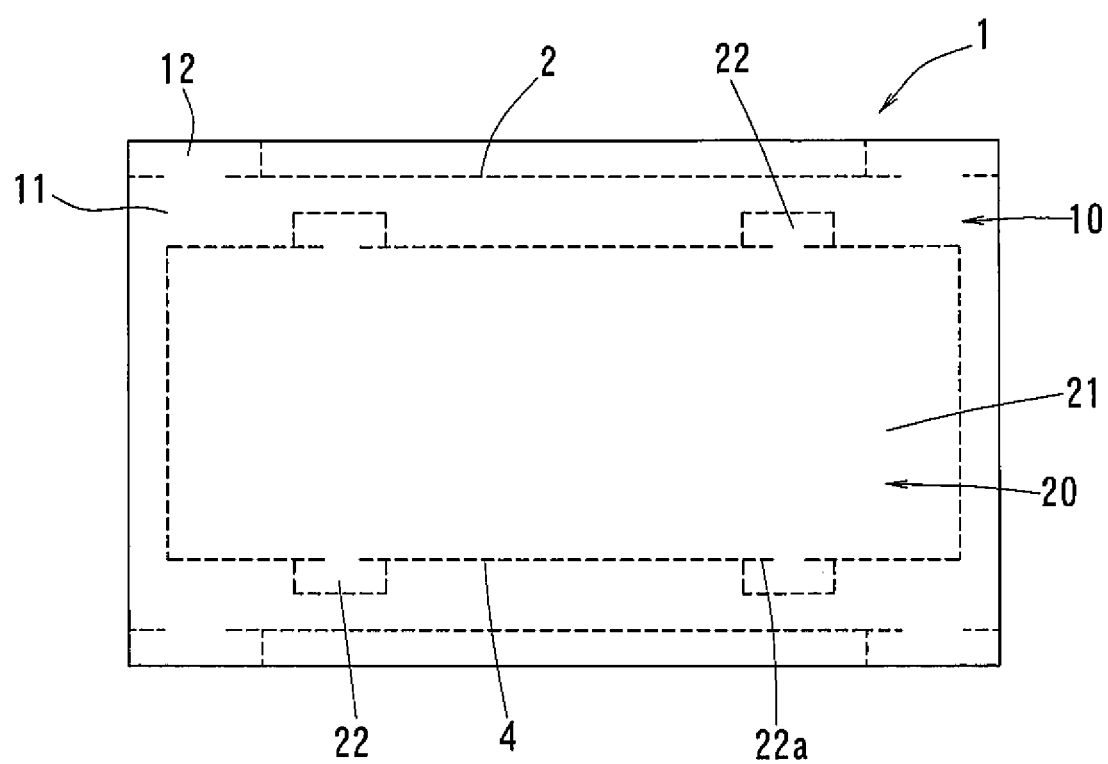
FIG. 8 is a front view illustrating a variation of the filter sheet of the different embodiment.

FIG. 8 illustrates a variation of the filter sheet 1 of the different embodiment.

The filter sheet 1 of this variation includes, inside the filter body 11, a second to-be-cut-out portion 20 (portion which is to be cut out) defined by a second perforated line 4 as an easy break line. By cutting out the second to-be-cut-out portion 20 by breaking the perforated line 4, the to-be-cut-out portion 20 is used as a small filter 20 of the different embodiment.

The small filter 20 of the different embodiment comprises a small filter body 21, and four small ears 22 integrally connected to the peripheral edge of the small filter body 21.

The small filter body 21 has a rectangular shape having long sides extending in the lateral direction in plan view. The small ears 22 have a rectangular shape having long sides extending in the lateral direction in plan view, and are on the long sides of the small filter body 21 and disposed at portions of the small filter body 21 other than its four corners. Therefore, the positions of the small ears 22 where the small ears 22 are connected to the small filter body 21, are displaced from the positions of the ears 12 where the ears 12 are integrally connected to the filter body 11, in the circumferential direction of the filter 10 and the small filter 20.

The small filter body 21 and the small ears 22 have adhesiveness on their back surfaces.

If the air vent to which the filter is to be attached has a small size, instead of the filter 10, the small filter 20 is used by cutting out the small filter 20 from the filter sheet 1.

As with the filter 10, the small filter 20 also has repulsion reducing portions 22a at the small ears. When attaching the small filter 20 to an air vent, each small ear 22 is bent at the boundary between the small filter body 21 and the small ear 22, but the repulsion reducing portions 22a prevent the return of the small ear 22 to its unbent state.

The above-described embodiments are mere examples in every respect, and the present invention is not limited thereto. The scope of the present invention is indicated by the claims, and should be understood to include all modifications and variations within the scope of the claims and the meaning equivalent thereto.

While the filter sheet 1 of the embodiment has a square shape in plan view, the shape of the filter sheet 1 is not limited thereto. For example, the filter sheet 1 may have a circular shape or a rectangular shape as in the different embodiment.

If the filter sheet 1 of the embodiment has a rectangular shape, a plurality of to-be-cut-out portions 10 may be arranged in a row in the direction of the long sides of the rectangular filter sheet so that the plurality of to-be-cut-out portions 10 can be cut out from the filter sheet 1.

While, in the filter sheet 1 of the embodiment, the to-be-cut-out portion 10 is defined, and the to-be-cut-out portion 20 is further defined inside of the to-be-cut-out portion 10, the structure of the filter sheet 1 is not limited thereto. For example, the to-be-cut-out portion 10 and the to-be-cut-out portion 20 may be arranged in juxtaposition in the filter sheet 1.

Also, a further different to-be-cut-out portion 20 may be defined inside of the to-be-cut-out portion 20 of the filter sheet 1 so that a filter smaller than the small filter 20 can be cut out.

While, in the embodiment, the adhesive layer 3 is disposed on one surface of the filter sheet 1 so that the filter 10 or the small filter 20 can be attached to a grille V by bonding, the structure of the filter sheet 1 is not limited thereto. For example, instead of the adhesive layer 3, the filter may be attached to a grille V by a different means, e.g., with a magnet or a hook and loop fastener.

If the adhesive layer 3 is used, the pattern of the adhesive layer 3 is not limited to the embodiment provided that the adhesive layer 3 is disposed at least on the back surfaces of the ears 12 and the small ears 22.

While, in the embodiment, the perforated lines 2 and 4 are exemplified as easy break lines, the easy break lines are not limited thereto, and may be, e.g., half-cut lines.

While, in the embodiment, the filter 10 and the small filter 20 have a circular shape in plan view, the shapes of the filters are not limited thereto. For example, the filters may have an oval shape, a square shape or a rectangular shape as in the different embodiment. For example, if the grille V has a square shape, a filter 10 and a small filter 20 are suitably usable which have a square shape coinciding with the shape of the grille V.

If the shape of the filter 10 or the small filter 20 does not coincide with the shape of the bonding object, the shape of the filter may be adjusted by appropriately cutting the filter body 11 or the small filter body 21 while leaving the ears 12 or the small ears 22 uncut. If, for example, the filter 10 is cut into four equal parts, it is possible to learn the degree of dirt by checking the heart-shaped figures, which are relatively noticeable in the adhesive layer 3. Since, as described above, the adhesive layer 3 has a cross-shaped adhesive-free portion, it is possible to easily cut the filter 10 into four equal parts along the adhesive-free portion. Since the filter is cut along the adhesive-free portion, no adhesive adheres to a cutting tool such as scissors.

Since, in the embodiment, the square frame-shaped figure is disposed, as a portion of the adhesive layer 3, on the sheet portion of the filter sheet 1 outside the to-be-cut-out portion 10, this sheet portion has adhesiveness on its back surface. Therefore, by cutting the filter sheet to partially include the sheet portion of the filter sheet outside of the to-be-cut-out portion, the cut portion of the sheet portion as well as the filter can be bonded to a bonding object.

While the ears 12 and the small ears 22 have a substantially trapezoidal shape in the embodiment, the shapes of the ears are not limited thereto. For example, the ears may have a semicircular shape, a square shape or a triangular shape. Also, ears 12 or small ears 22 different in shape may be used.

Also, while four ears 12 and four small ears 22 are used in the embodiment, the numbers thereof are not limited to four, and may be not more than 3 or not less than 5. While, in the embodiment, the ears 12 and the small ears 22 are disposed at equal intervals, and this is preferable in that the filters can be kept bonded stably, the ears 12, 22 may be disposed at different intervals.

While, in the embodiment, the small ears 22 are angularly displaced from the ears 12, the small ears 22 may be angularly aligned with the respective ears 12.

Also, when the small ears 22 are angularly displaced from the ears 12, the displacement angle is not limited to about 45 degrees as in the embodiment.

While, in the embodiment, the ears 12 are integral with the filter body 11, and the small ears 22 are integral with the small filter body 21, each of the ears 12 and the small ears 22 may be a separate member integrally jointed to the filter body 11, 21 by an appropriate means such as welding.

The repulsion reducing portions 12a and 22a are formed at the ears 12 and the small ears 22a in the embodiment, but may be omitted.

Figure 9A:
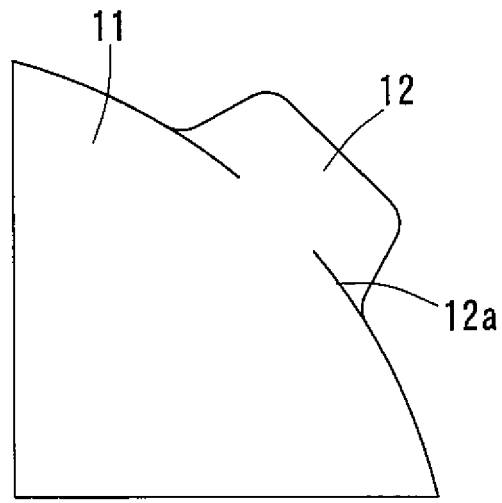
FIG. 9A and FIG. 9B are enlarged front views each illustrating a variation of a portion of the filter according to the embodiment.
Figure 9B:
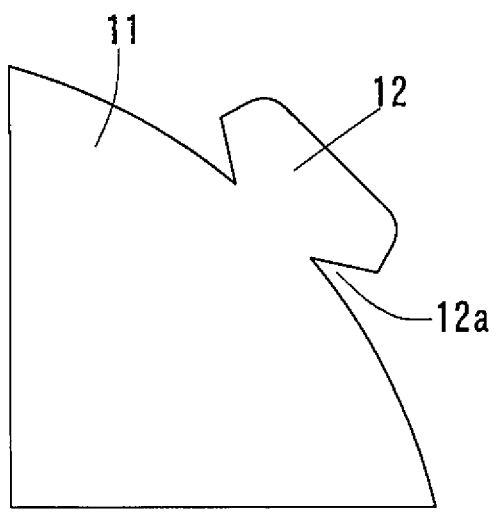

When the repulsion reducing portions 12a and 22a are formed, they are not limited to the embodiment. For example, the repulsion reducing portions of each ear may be not perforated lines but slit-shaped cuts as illustrated in FIG. 9A. Alternatively, the repulsion reducing portions may be notch-shaped cuts having a width as illustrated in FIG. 9B.

Figure 10A:
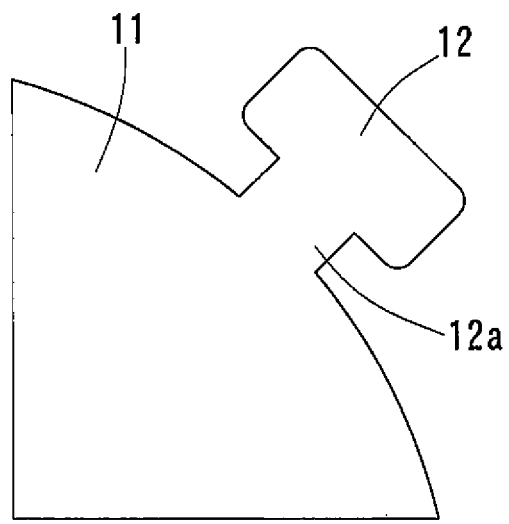
FIG. 10A and FIG. 10B are enlarged front views each illustrating a different variation of a portion of the filter according to the embodiment.
Figure 10B:
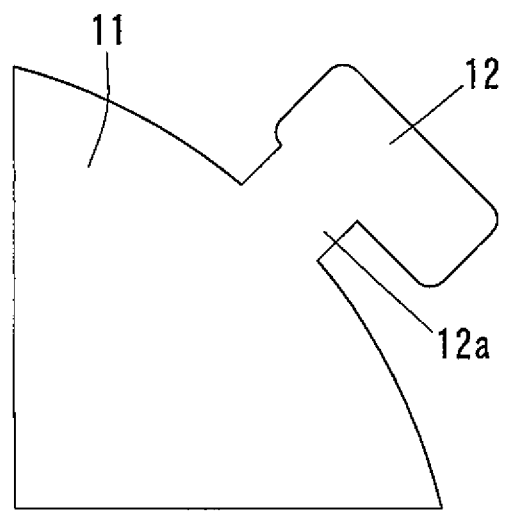

Also, as illustrated in FIG. 10A, a repulsion reducing portion 12a, 22a comprising a narrow portion (portion with a reduced width) may be formed at each ear 12, 22 or as illustrated in FIG. 10B, the narrow portion may be displaced from the center.

The repulsion reducing portions 12a, 22a do not need to be portions cut beforehand, or portions cut when the filter is used provided that they can reduce the repulsion of the filter material, and they may be half-cut portions which are not cut even when the filter is used.

If the repulsion reducing portions 12a, 22a are perforated lines, in the embodiment, perforated lines forming the repulsion reducing portions 12a, 22a are formed on the imaginary line extending from the perforated line 2, 4, which defines the to-be-cut-out portion 10, 20. However, the perforated lines do not need to be connected to the perforated line 2, 4, and may be disconnected or displaced from the perforated line 2, 4.

While, in the embodiment, a grille V of an air vent is exemplified as the bonding object to which the filter is attached, the bonding object is not limited thereto provided that passage of air is allowed. For example, the bonding object may be a range hood, the inlet/outlet of a ventilation fan, an air vent of a room on the inner side, or an air vent of a bathroom door.

That is, the filter 10 of the present invention is also usable for bonding objects other than air vents regardless of whether the filter is used outside or inside of a building If the filter is attached to a range hood, the inlet/outlet of a ventilation fan, an air vent of a room on the inner side or an air vent of a bathroom door, the shapes and the sizes of the filter sheet 1, the filter 10, the small filter 20, the ears, etc. can be appropriately set according to such a bonding object, and are not limited to those of the filter sheet 1 and its elements of the embodiment, which are attached to a grille. Also, if a nonwoven fabric is used, the thickness of the nonwoven fabric and its weight per unit area can be appropriately set according to such a bonding object. For example, if a nonwoven fabric is used for a range hood, the weight of the nonwoven fabric per unit area can be set within the range of 20 to 150 g/m².

While, in the embodiment, the filter 10 and the small filter 20 are used by cutting out these filters from the filter sheet 1, a filter 10 and a small filter 20 may be used which are in a completed state and do not need to be cut out.

DESCRIPTION OF REFERENCE NUMERALS

1: Filter sheet (sheet for a filter)
2: Perforated line
3: Adhesive layer
3a: Ring-shaped FIG.
3b: Chimney-shaped FIG.
4: Second perforated line
10: filter
11: Filter body
12: Ear
12a: Repulsion reducing portion
20: Small filter
21: Small filter body
22: Small ear
22a: Repulsion reducing portion
V: Grille
v1: Front surface
v2: Side surface
F: Frame body
f1: Front surface
f2: Side surface
W: Wall surface

The invention claimed is:

1. A filter sheet comprising a first to-be-cut-out portion which is defined by a first perforated line, and which is usable as a filter by being cut out by breaking the first perforated line,
wherein the first to-be-cut-out portion comprises:
a first filter body; and
one or more first ears integrally connected to an outer edge of the first filter body,
wherein the filter, which is formed by cutting out the first to-be-cut-out portion from the filter sheet, is attachable to a bonding object that has a front surface and a side surface, and through which air can pass, by bringing the first filter body into abutment with the front surface of the bonding object, and bending the one or more first ears relative to the first filter body until the one or more first ears abut against the side surface of the bonding object,
wherein each first ear of the one or more first ears includes, at a boundary between the first filter body and the first ear, a repulsion reducing portion for reducing elastic repulsion of a material of the filter when the first ear is bent relative to the first filter body, and
wherein the repulsion reducing portion of each first ear of the one or more first ears comprises cuts formed at the boundary between the first filter body and the first ear, or perforated portions which can become cuts by being broken when the filter is used.

2. The filter sheet according to claim 1, wherein one surface of each first ear of the one or more first ears is an adhesive layer that allows bonding of the filter to the side surface of the bonding object.

3. The filter sheet according to claim 1, wherein the filter is an air vent filter for an air vent of a building.

4. A filter sheet comprising a first to-be-cut-out portion which is defined by a first perforated line, and which is usable as a filter by being cut out by breaking the first perforated line,
wherein the first to-be-cut-out portion comprises:
a first filter body; and
one or more first ears integrally connected to an outer edge of the first filter body,
wherein the filter, which is formed by cutting out the first to-be-cut-out portion from the filter sheet, is attachable to a bonding object that has a front surface and a side surface, and through which air can pass, by bringing the first filter body into abutment with the front surface of the bonding object, and bending the one or more first ears relative to the first filter body until the one or more first ears abut against the side surface of the bonding object,
wherein the first filter body has a substantially circular shape,
wherein the one or more first ears comprises a plurality of first ears that are disposed at equal intervals in a circumferential direction of the first filter body,
wherein each first ear of the plurality of first ears includes, at a boundary between the first filter body and the first ear, a repulsion reducing portion for reducing elastic repulsion of a material of the filter when the first ear is bent relative to the first filter body, and
wherein the repulsion reducing portion of each first ear of the plurality of first ears comprises cuts formed at the boundary between the first filter body and the first ear, or perforated portions which can become cuts by being broken when the filter is used.

5. The filter sheet according to claim 4, wherein one surface of each first ear of the plurality of first ears is an adhesive layer that allows bonding of the filter to the side surface of the bonding object.

6. The filter sheet according to claim 4, wherein the filter is an air vent filter for an air vent of a building.

7. A filter sheet comprising a first to-be-cut-out portion which is defined by a first perforated line, and which is usable as a filter by being cut out by breaking the first perforated line,
wherein the first to-be-cut-out portion comprises:
a first filter body; and
one or more first ears integrally connected to an outer edge of the first filter body, wherein the filter, which is formed by cutting out the first to-be-cut-out portion from the filter sheet, is attachable to a bonding object that has a front surface and a side surface, and through which air can pass, by bringing the first filter body into abutment with the front surface of the bonding object, and bending the one or more first ears relative to the first filter body until the one or more first ears abut against the side surface of the bonding object, wherein the first filter body has a rectangular shape having long sides extending in a lateral direction, wherein the one or more first ears comprises a plurality of first ears that are disposed along the long sides of the first filter body, wherein each first ear of the plurality of first ears includes, at a boundary between the first filter body and the first ear, a repulsion reducing portion for reducing elastic repulsion of a material of the filter when the first ear is bent relative to the first filter body, and wherein the repulsion reducing portion of each first ear of the plurality of first ears comprises cuts formed at the boundary between the first filter body and the first ear, or perforated portions which can become cuts by being broken when the filter is used.

8. The filter sheet according to claim 7, wherein one surface of each first ear of the plurality of first ears is an adhesive layer that allows bonding of the filter to the side surface of the bonding object.

9. The filter sheet according to claim 7, wherein the filter is an air vent filter for an air vent of a building.

10. A filter sheet comprising a first to-be-cut-out portion which is defined by a first perforated line, and which is usable as a filter by being cut out by breaking the first perforated line,
    wherein the first to-be-cut-out portion comprises:
        a first filter body; and
        one or more first ears integrally connected to an outer edge of the first filter body,
    wherein the filter, which is formed by cutting out the first to-be-cut-out portion from the filter sheet, is attachable to a bonding object that has a front surface and a side surface, and through which air can pass, by bringing the first filter body into abutment with the front surface of the bonding object, and bending the one or more first ears relative to the first filter body until the one or more first ears abut against the side surface of the bonding object,
    wherein the filter sheet further comprises, inside the first filter body, a second to-be-cut-out portion comprising:
        a second filter body defined by a second perforated line, the second filter body being smaller than the first filter body; and
        one or more second ears integrally connected to an outer edge of the second filter body, the one or more second ears being smaller than the one or more first ears,
    wherein the second to-be-cut-out portion is usable as a small filter by being cut out by breaking the second perforated line, and
    wherein a position of each second ear of the one or more second ears where the second ear is integrally connected to the second filter body is displaced, in a circumferential direction of the filter sheet, from a position of each first ear of the one or more first ears where the first ear is integrally connected to the first filter body.

11. The filter sheet according to claim 10, wherein one surface of each first ear of the one or more first ears is an adhesive layer that allows bonding of the filter to the side surface of the bonding object.

12. The filter sheet according to claim 10, wherein the filter is an air vent filter for an air vent of a building.

13. A filter sheet comprising a first to-be-cut-out portion which is defined by a first perforated line, and which is usable as a filter by being cut out by breaking the first perforated line,
    wherein the first to-be-cut-out portion comprises:
        a first filter body; and
        one or more first ears integrally connected to an outer edge of the first filter body,
    wherein the filter, which is formed by cutting out the first to-be-cut-out portion from the filter sheet, is attachable to a bonding object that has a front surface and a side surface, and through which air can pass, by bringing the first filter body into abutment with the front surface of the bonding object, and bending the one or more first ears relative to the first filter body until the one or more first ears abut against the side surface of the bonding object,
    wherein the first filter body has a substantially circular shape,
    wherein the one or more first ears comprises a plurality of first ears that are disposed at equal intervals in a circumferential direction of the first filter body,
    wherein the filter sheet further comprises, inside the first filter body, a second to-be-cut-out portion comprising:
        a second filter body defined by a second perforated line, the second filter body being smaller than the first filter body; and
        one or more second ears integrally connected to an outer edge of the second filter body, the one or more second ears being smaller than the plurality of first ears,
    wherein the second to-be-cut-out portion is usable as a small filter by being cut out by breaking the second perforated line, and
    wherein positions of the second ears where the second ears are integrally connected to the second filter body are displaced, in a circumferential direction of the filter sheet, from positions of the first ears where the first ears are integrally connected to the first filter body.

14. The filter sheet according to claim 13, wherein one surface of each first ear of the plurality of first ears is an adhesive layer that allows bonding of the filter to the side surface of the bonding object.

15. The filter sheet according to claim 13, wherein the filter is an air vent filter for an air vent of a building.

16. A filter sheet comprising a first to-be-cut-out portion which is defined by a first perforated line, and which is usable as a filter by being cut out by breaking the first perforated line,
    wherein the first to-be-cut-out portion comprises:
        a first filter body; and
        one or more first ears integrally connected to an outer edge of the first filter body,
    wherein the filter, which is formed by cutting out the first to-be-cut-out portion from the filter sheet, is attachable to a bonding object that has a front surface and a side surface, and through which air can pass, by bringing the first filter body into abutment with the front surface of the bonding object, and bending the one or more first ears relative to the first filter body until the one or more first ears abut against the side surface of the bonding object, wherein the first filter body has a rectangular shape having long sides extending in a lateral direction, wherein the one or more first ears comprises a plurality of first ears that are disposed along the long sides of the first filter body, wherein the filter sheet further comprises, inside the first filter body, a second to-be-cut-out portion comprising:
a second filter body defined by a second perforated line, the second filter body being smaller than the first filter body; and
one or more second ears integrally connected to an outer edge of the second filter body, the one or more second ears being smaller than the plurality of first ears, wherein the second to-be-cut-out portion is usable as a small filter by being cut out by breaking the second perforated line, and wherein positions of the second ears where the second ears are integrally connected to the second filter body are displaced, in a circumferential direction of the filter sheet, from positions of the first ears where the first ears are integrally connected to the first filter body.

17. The filter sheet according to claim 16, wherein one surface of each first ear of the plurality of first ears is an adhesive layer that allows bonding of the filter to the side surface of the bonding object.

18. The filter sheet according to claim 16, wherein the filter is an air vent filter for an air vent of a building.

19. A filter comprising:
a filter body; and
one or more ears integrally connected to an outer edge of the filter body,
wherein the filter is attachable to a bonding object that has a front surface and a side surface, and through which air can pass, by bringing the filer body into abutment with the front surface of the bonding object, and bending the one or more ears relative to the filter body until the one or more ears abut against the side surface of the bonding object,
wherein each ear of the one or more ears includes, at a boundary between the filter body and the ear, a repulsion reducing portion for reducing elastic repulsion of a material of the filter when the ear is bent relative to the filter body, and
wherein the repulsion reducing portion of each ear of the one or more ears comprises cuts formed at the boundary between the filter body and the ear, or perforated portions which can become cuts by being broken when the filter is used.

* * * * *